ates Patent [19] [11] 4,047,918
Heithoff [45] Sept. 13, 1977

[54] WATER COOLED GLASS STIRRER

[75] Inventor: Robert B. Heithoff, Wichita Falls, Tex.

[73] Assignee: PPG Industries, Inc., Pittsburgh, Pa.

[21] Appl. No.: 711,017

[22] Filed: Aug. 2, 1976

[51] Int. Cl.² .................................................. C03B 5/18
[52] U.S. Cl. ........................................ 65/179; 65/178
[58] Field of Search ............................ 65/178, 179, 180

[56] References Cited

U.S. PATENT DOCUMENTS

| | | | |
|---|---|---|---|
| 2,022,223 | 11/1935 | Taylor | 65/178 |
| 2,049,600 | 8/1936 | Wright | 34/29 |
| 2,189,271 | 2/1940 | Rowe | 65/134 |
| 2,982,522 | 5/1961 | Hamilton et al. | 65/92 |
| 3,236,618 | 2/1966 | Allman | 65/178 |
| 3,350,187 | 10/1967 | Brichard et al. | 55/134 |
| 3,498,778 | 3/1970 | Hynd | 65/178 |
| 3,505,053 | 4/1970 | Noe | 65/178 |
| 3,971,646 | 7/1976 | Rhodes | 65/157 |
| 3,989,497 | 11/1976 | Dickinson et al. | 65/178 X |

FOREIGN PATENT DOCUMENTS

| | | |
|---|---|---|
| 828,361 | 10/1975 | Belgium |
| 494,668 | 1954 | Italy ..................................... 65/178 |
| 18457 | 1974 | United Kingdom |
| 18458 | 1974 | United Kingdom |

Primary Examiner—Arthur D. Kellogg
Attorney, Agent, or Firm—E. Kears Pollock

[57] ABSTRACT

A glassmaking furnace having a melter and a refiner joined through a waist is provided with a plurality of glass stirrers positioned transversely across the intended path of glass flow through the waist. Each stirrer comprises two coaxial pipes, an inner pipe and an outer pipe, the outer pipe having a bent loop extension at one end, such that one end of the bent loop extension is in communication with the annular space between the pipes and the other end is in communication with the inner pipe. Each stirrer is provided with means for supplying a coolant to the pipes and means for rotating the stirrer in order to homogenize glass before it is fully refined by appropriate thermal conditioning in the refiner of the furnace.

7 Claims, 5 Drawing Figures

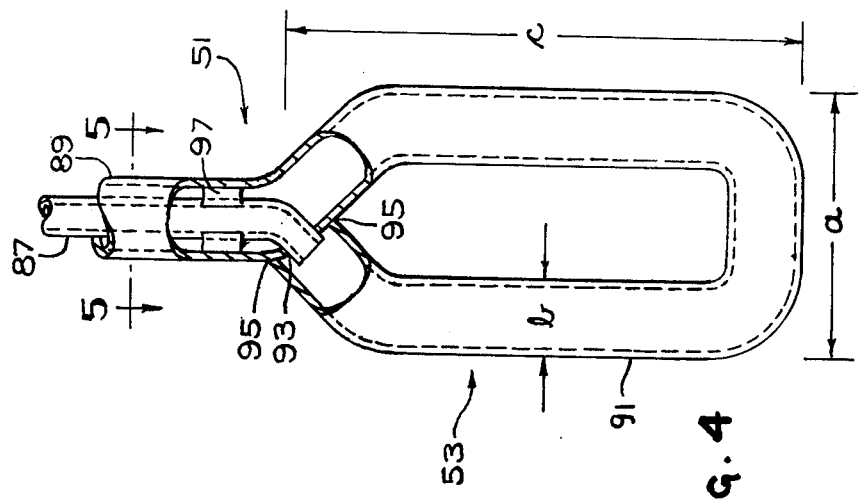
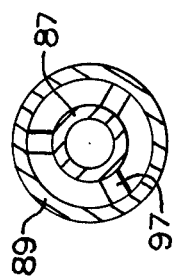
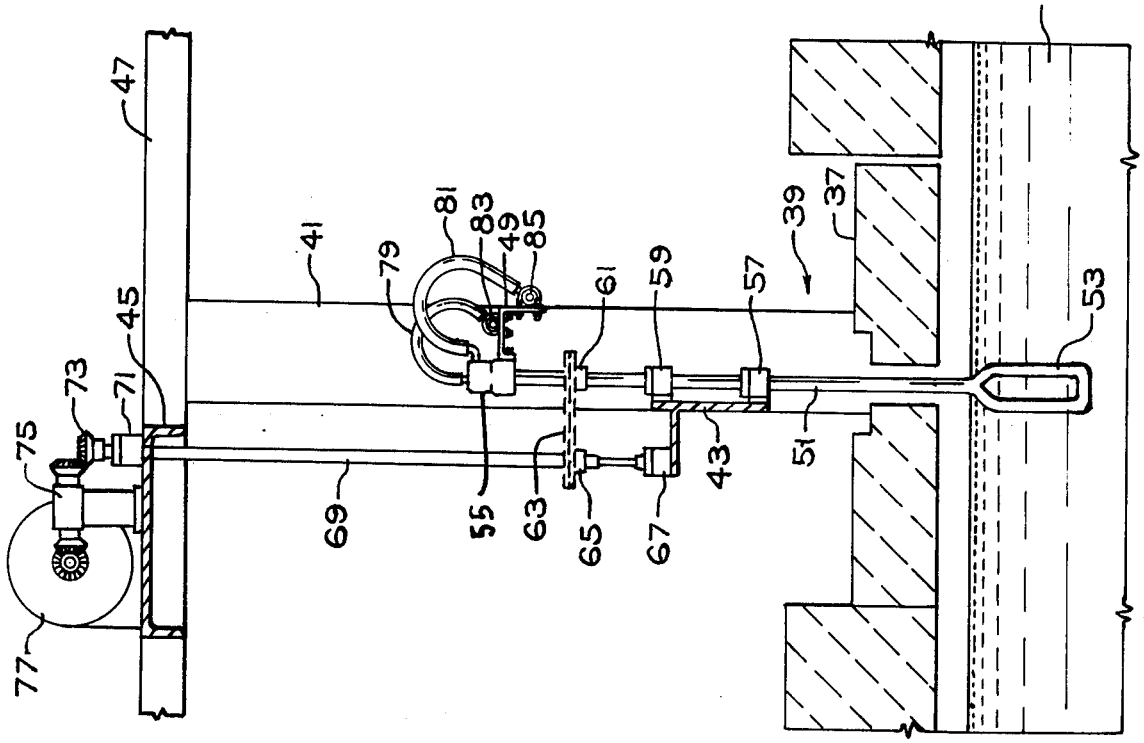

WATER COOLED GLASS STIRRER

BACKGROUND OF THE INVENTION

Field of the Invention: This invention concerns the melting and the refining of glass and is particularly directed to devices for stirring molten glass to homogenize it prior to its being fully refined.

Brief Description of the Prior Art: Glass stirring devices are well known and have been employed in the past for homogenizing molten glass. They have been used particularly in optical glass manufacture and in the forehearths of glassmaking furnaces to stir glass immediately prior to discharge of the glass for forming into useful glass articles. Two U.S. Pat. Nos. 2,022,223 to Taylor and No. 2,049,600 to Wright disclose the use of devices for contacting molten glass in the relatively narrow waists of continuous glassmaking furnaces. The device of Wright is located in a continuous glassmaking furnace shown to be employed for discharging molten glass to the drawing kiln of a glass sheet drawing process. It comprises, not a stirrer per se, but rather a barrier which is intermittently placed in the molten glass to retard the surface flow of the glass and permit the accumulation of floating impurities behind the device which is periodically lifted to allow the accumulated floating impurities to pass downstream through the furnace and into the working zone of the drawing kiln attached thereto. The patent to Taylor, however, discloses a pair of rotating stirrers comprising cooled fingers having bent refractory thimbles attached to their working ends. The thimbles are used to homogenize the molten glass by engaging the glass from each side of the furnace waist and stirring the glass.

A number of patents disclose the use of molten glass stirrers in the forehearths of glassmaking furnaces rather than in the waists of furnaces. These patents illustrated several particular stirrer structures. Inparticular, U.S. Pat. No. 2,982,522 to Hamilton et al shows a stirrer which may be rotatated to homogenize molten glass. The stirrer of Hamilton et al comprises a coaxial pair of pipes providing a stirrer shaft. Extending outwardly from the lower end of the shaft are coaxial pipe extensions. The stirrer may be cooled by the introduction of coolant into the annular space and though the inner pipe of the stirrer during use. The present invention, as will be described further below, provides water cooled glass stirrers which are suitable for use in the waist between the melter and the refiner of a glassmaking furnace which are useful together with a plurality of similar stirrers aligned across the width of such a furnace waist in closely spaced relation to one another.

SUMMARY OF THE INVENTION

A horizontal glassmaking furnace having a melter and a refiner or conditioner connected through a waist having substantially less width than either the melter or the refiner/conditioner is provided with a plurality of glass stirrers positioned in the furnace waist for homogenizing molten glass passing through the waist prior to being fully refined and conditioned for discharge from the refiner/conditioner.

The furnace is provided with a row of at least four stirring paddles extending in a row across the width of the furnace waist, the row being transverse to the intended movement of molten glass through the waist. Each paddle is rotatably mounted for rotation about a substantially vertical axis which may be aligned in a vertical orientation or at a slight angle on the order of up to 30° from vertical. Each paddle includes a supporting axial section or shaft comprising two coaxial pipes, an inner pipe and an outer pipe. The pipes are each generally iron or steel pipes. An annular space is provided between the pipes, and spacers are preferably provided to maintain a uniform annular space along the length of this axial shaft of a stirrer.

At the lower end of the axial shaft of each stirrer is a paddle section comprising a bent loop extension of the outer pipe. One end of this bent loop extension is in communication with the annular space between the pipes and the other end of the bent loop extension is in communication with the inside of the inner pipe. Thus, a closed loop is provided for circulating coolant through the stirrer.

Means are provided at the upper end of the paddles or stirrers for supplying coolant to them during their rotation. A rotatable fluid coolant connection is provided so that fresh coolant may be supplied to the inner pipe or the annular space and heated coolant which has already circulated through the stirrer may be discharged from the annular space or inner pipe, respectively. Connected to the upper end of the axial shaft of the stirrer is some means for rotating the stirrer, such as a wheel provided with a chain or belt which is driven by a drive wheel connected to a motor or the like.

The stirrers are preferably spaced uniformly from one another in order to insure that no spacing between adjacent stirrer paddles is sufficient to permit unhomogenized glass to bypass the effective mixing zones of adjacent stirrers.

During use, the stirrers are continuously rotated as molten glass passes through the waist from the melter to the refiner/conditioner of the furnace. They serve to homogenize the glass and to enhance the rate of refinement. Adjacent stirrers are preferably rotated in opposing directions in order to increase the shear forces and rates of shear in the molten glass between adjacent stirrers. Thus, in a row of several stirrers a first group of alternate stirrers are rotated clockwise and the remaining group of alternate stirrers are rotated counterclockwise.

In a preferred embodiment of this invention wherein the glassmaking furnace is a furnace for melting, refining and conditioning molten glass for discharge to a continuous flat glass forming chamber and process, the furnace waist is provided with a row of at least 10 stirrers. Each stirrer preferably has an outer loop dimension that is three to ten, and more preferably is three to five, times the effective thickness of the loop. The thickness of the loop is, of course, the outside diameter of the outer pipe. With such a spacing the open space betwen the sides of the loop ranges from one to three times the outside diameter of the outer pipe. When using stirrers having these dimensions, adjacent stirrers in a row of stirrers may be placed close to one another, and the rotation of each stirrer provides a sufficient shearing action on the molten glass to thoroughly homogenize it. Meanwhile, stirrers having such dimensions apparently have sufficient mechanical strength to resist significant fatigue of the metal pipe under the operating conditions encountered in a typical glassmaking furnace. Thus, these stirrers re expected to have prolonged useful lives as compared to platinum stirrers, platinum-clad stirrers or refractory-clad stirrers as described by Taylor. No glass defects appear to occur as a result of contact between the stirrers of the present design and molten glass and no particular care, beyond providing coolant, appears necessary for maintaining the stirrers of this invention in good, workable condition for extended periods.

Th stirrers of this invention preferably extend into a pool of molten glass to a depth beneath its upper surface that is about one-third of the full depth of the pool of molten glass. The glass encountered by the stirrers is that in the upper, forwardly flowing layer of glass while mixing of the lower, returning flow of glass is avoided so that entrainment of it in the forwardly flowing layer is also divided.

This invention may be further appreciated with reference to the drawings in which the details of preferred embodiments of this invention are shown.

BRIEF DESCRIPTON OF THE DRAWINGS

FIG. 3 is a partial longitudinal cross-sectional elevation of the waist region of the furnace illustrated in FIGS. 1 and 2 showing the relationship between a stirrer according to this invention and its supporting structure and service equipment;

FIG. 4 is a partially cut-away view of the mixing end of a stirrer according to this invention illustrating the bent loop extension of the outer pipe and showing how it is made to be in commnication with the annular space of the axial section of the stirrer at one end and with the inside of the inner pipe at its other end; and FIG. 5 is a cross-sectional view of the axial section of a stirrer illustrating the spacers employed to maintain a substantially uniform annular space for coolant flow through the stirrer.

DESCRIPTION OF THE PREFERRED EMBODIMENTS

Figure 1:
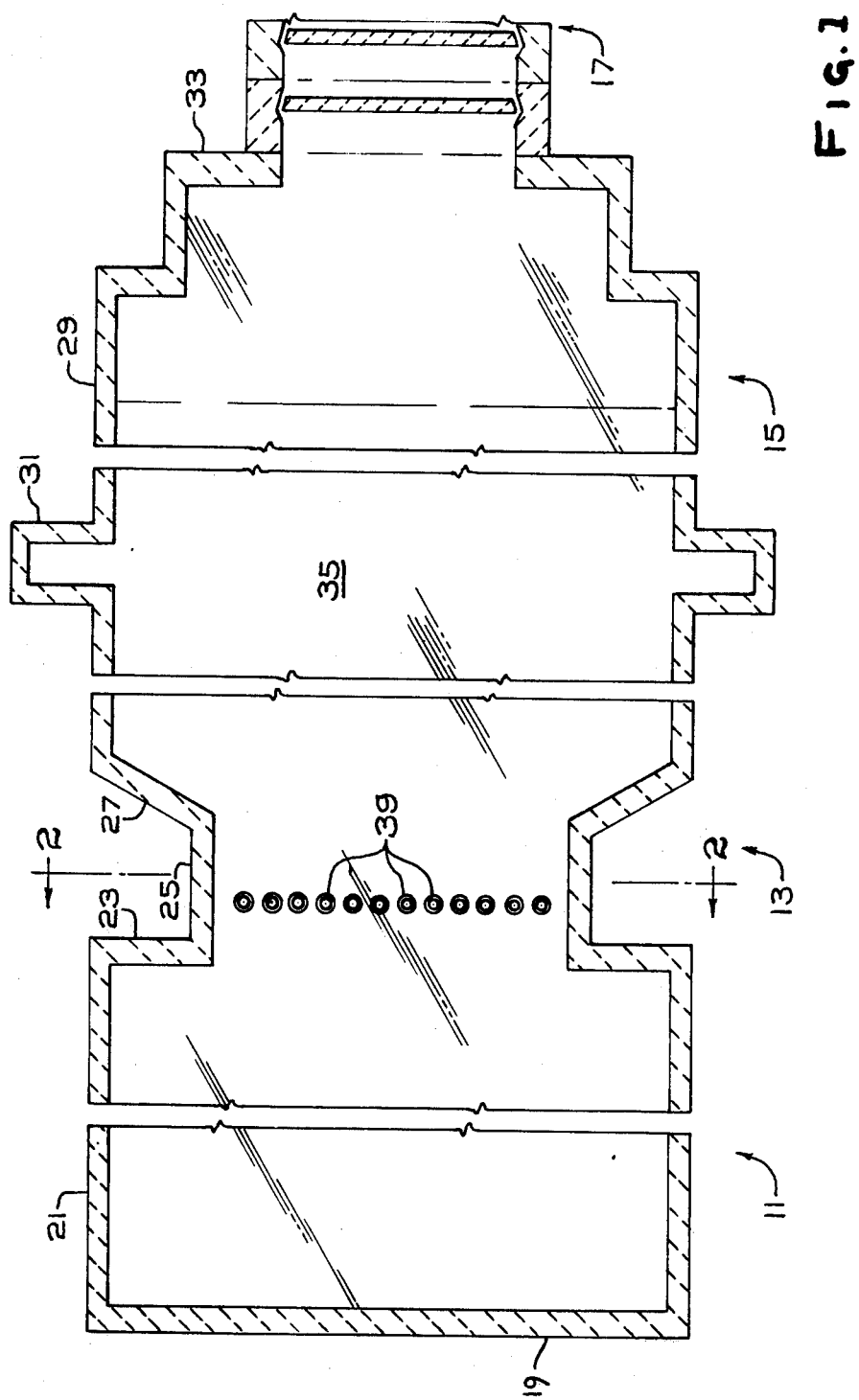
FIG. 1 is a cross sectional plan of a horizontal glassmaking furnace having a waist illustrating the location of a row of glass stirrers in that waist.
Figure 2:
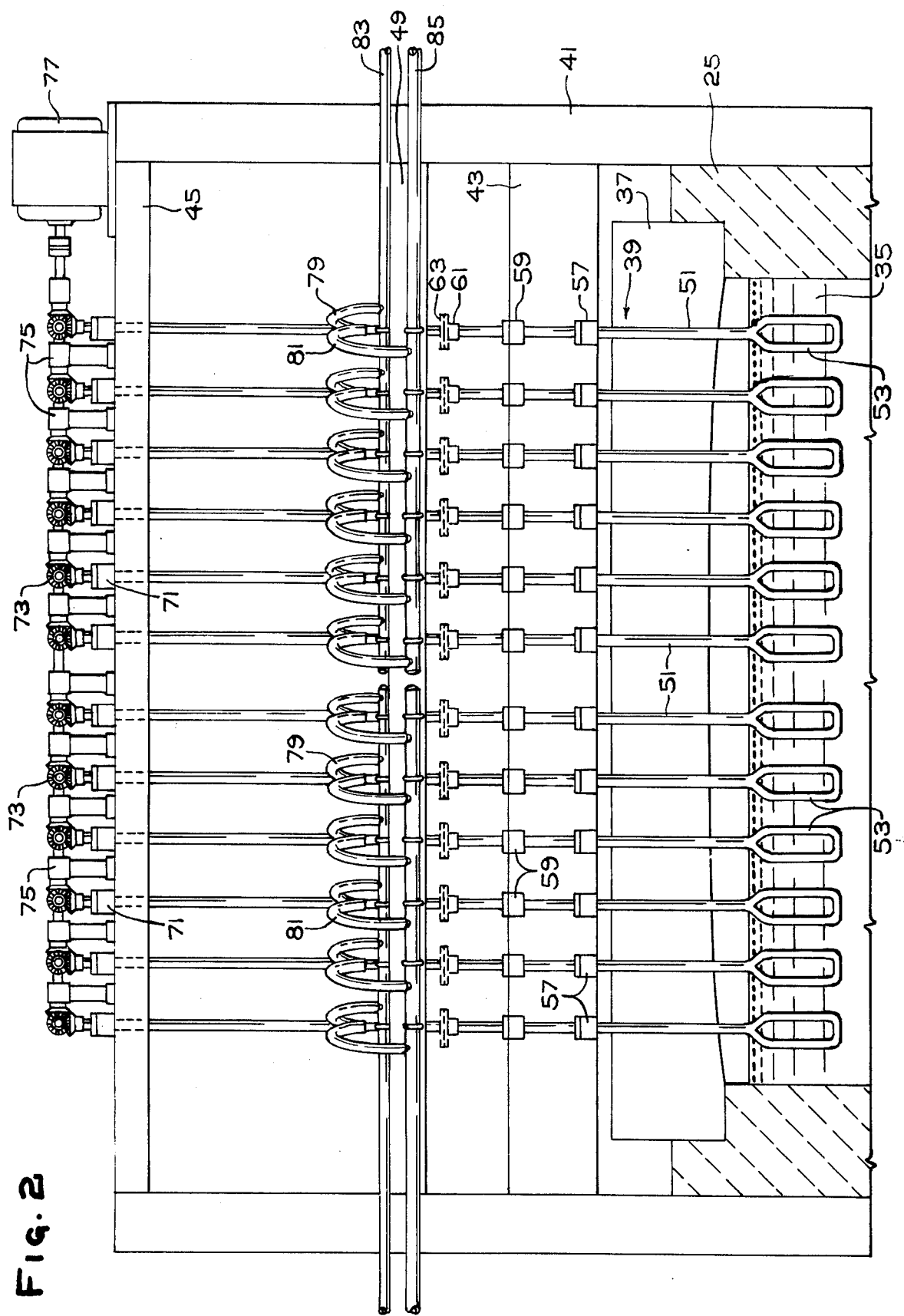
FIG. 2 is a transverse cross sectional elevation of the waist region of the furnace illustrated in FIG. 1 taken along section line 2—2 thereof.

Referring first to FIGS. 1, 2 and 3 the general environment and use of a series of stirrers according to this invention are illustrated.

A glassmaking furnace comprising a melter 11, a waist 13 and a refiner/conditioner 15 is connected to a delivery facility 17 for delivering refined and conditioned molten glass to a flat glass forming chamber, not shown. The glassmaking furnace includes a back wall 19, side walls 21 and corner walls 23. All of these walls in FIG. 1 are illustrated at an elevation cutting through the basin wall section just at or above the elevation of the upper surface of a pool of molten glass maintained in the furnace. Therefore, the side firing ports on a typical side-fired, regenerative furnace do not appear in FIG. 1.

The waist includes waist side walls 25 and tapered walls 27 leading to the refiner 15. The refiner includes side walls 9, doghouses or skim kilns 31 and a front wall 33. A pool of molten glass 35 is contained within the glassmaking furnace. Of course, as unmelted raw glass batch material is fed to the furnace (at the left end as illustrated in FIG. 1) there will be a floating layer of unmelted batch materials on the surface of this pool of molten glass. While such a layer of batch materials is not shown in the drawings for the purposes of clarity, batch materials could extend along a substantial length of the melter ending at some location upstream, that is, to the left of FIG. 1 from the waist 13.

Extending over the furnace is a roof or crown. In the waist region 13, the waist crown 37 is spaced relatively closely to the upper surface of the pool of molten glass. Located in the waist are several stirrers 39 which are described in greater detail below. Extending upwardly at each side of the waist are vertical structural members 41. Connected to these are a lower, horizontal, cross support beam 43 an an upper, longitudinal support beam 47. An upper, cross support beam 45 is connected, in turn, to the longitudinal beam 47. Mounted on the vertical structural members 41 and extending across the waist is a hose and pipe support beam 49.

Each stirrer 39 comprises an axial shaft section 51 with a stirrer paddle section 53 connected to its lower most end. The paddle section 53 is a bent loop extension of a pipe as described before. At its upper end the shaft 51 is provided with a rotary union 55. The shaft 51 is mounted by means of rotary mounts 57 and 59 onto the lower horizontal beam support 43. The rotary mounts preferably include bearings. A driven wheel 61 is mounted on the shaft 51 and a drive belt or chain 63 is provided about the driven wheel 61. Drive belt or chain 63 also engages a drive wheel 65. A rotary mount 67 is mounted on the lower support beam 43 and a drive shaft 69 is mounted in the rotary mount 67. The drive shaft 69 is connected to an upper rotary mount 71 on upper support beam 45. The drive wheel 65 is mounted to the drive shaft 69. The shaft 69 is provided with a gear 73 operatively associated with a transfer gear assembly 75 which in turn is operatively associated with a motor 77 having a drive gear. This combination provides means for rotating the stirrer 39 about its axial shaft 51.

An inlet hose 79 having a connector is connected to the rotary union 55 as an outlet hose 81 also having a connector. The inlet and outlet hoses 79 and 81 are respectively connected to an inlet pipe 83 and to an outlet pipe 85. They are also respectively in communication, through the rotary union 55, with an inside pipe 87 and an outside pipe 89, which together make up the axial shaft 51 of the stirrer 39.

The inside pipe 87 is coaxial with the outside pipe 89 and positioned within it to provide an annular space between them. The lower paddle section 53 of the stirrer is made up of a bent loop extension 91 of the outer pipe 89. A hole 93 is provided through the outer pipe 89, and the inside pipe 87 extends slightly through the hole 93. The bent loop extension of the outer pipe 91 is welded to the outside pipe at weld 95 surrounding the hole 93 so that the bent loop extension is in communication at one end with the annular space between the pipes 87 and 89 and at the other end is in communication with the inside of pipe 87. The pipes are provided with spacers 97 to maintain the annular space between them.

The ratio of the paddle width-to-thickness is about three-to-one (i.e., the ratio a:b as seen in the embodiment illustrated in FIG. 4). The paddle height (c in FIG. 4) is from one-fourth to one-third of the depth of the glass at the waist of the furnace where the stirrers are installed.

A glass making furnace employing the stirrers according to this invention is effectively used to produce a continuous stream of well refined, homogeneous molten glass to a forming operation. In a typical horizontal, side-fired, regenerative glassmaking furnace producing about 400 tons of glass per day, twelve stirrers are positioned in a row across the furnace waist as shown in the accompanying drawings. The stirrers are preferably rotated continuously; however, they may be stopped and restarted without difficulty. The stirrer located at the extreme right of the furnace centerline, looking from the refiner toward the melter as in FIG. 2, is rotated in a counterclockwise motion (looking down) and the stirrer on the extreme left is rotated in a clockwise motion. The remaining stirrers are rotated alternately clockwise and counterclockwise. The rate of rotation is from about 10 to about 25 revolutions per minute.

Each stirrer is made of an outer pipe having an outside diameter of 1-178 inch (3.8 centimeters) and an inner pipe having an outside diameter of 1-⅛ inch (2.8 centimeters). The pipes are ordinary iron pipes. Cooling water if fed to each stirrer at a rate of from about 10 to about 15 gallons per minute (38 to 57 liters per minute). The incoming water temperature is about 70°–75° F. (~25° C.) and there is a temperature rise of about 25° F. (16° C.) experienced by the water as it passes through the stirrer.

The glass produced is substantially free of seed, stones, striae or other inhomogeneities.

After several months of operation the stirrers were examined and found to be substantialy free of wear or corrosion. It is believed that such stirrers will remain serviceable for an extended period. In general, platinum-clad refractory stirrers would require replacement within nine months to a year in the same environment.

During the use of stirrers according to this invention, the potential for bubble defects in glass being produced due to failure of platinum-clad refractories is eliminated. With the present design a sealed, cooled assembly extends from above the furnace waist crown downwardly into contact with the molten glass in the furnace and there are no troublesome joints or seals inside the furnace itself. This reduces maintenance problems associated with such joints or seals.

One of the benefits of using stirrers of the kind described here is that glass bottles may be recycled to a furnace employing them if the bottle glass composition is compatible with the glass being melted even though the recycled bottles may include some with aluminum metal rings or caps. The presence of aluminum would cause platinum-clad refractory stirrers to deteriorate quickly due to the ultimate formation of a low melting platinum alloy as a result of reaction involving silicon in the glass and the aluminum. Rather than permit the ready deterioration of platinum-clad refractory stirrers, it is likely that recycling of such bottles would simply be avoided in melting furnaces with stirrers except those of the present design.

All in all, use of stirrers such as described here permits the making of thoroughly homogenized glass without having to contend with the risks or costs associated with the use of platinum-clad refractory stirrers.

While this invention has been described with reference to particularly preferred embodiments for purposes of illustration, those skilled in the art will recognize variations and equivalents within the scope and spirit of this invention as defined by the appended claims. For example, a plurality of rows of stirrers may be used to further enhance homogenization of molten glass, particularly in a narrow waisted furnace.

I claim:

1. In a horizontal glassmaking furnace for melting, refining and conditioning glass for discharge to a flat glass forming process comprising a melter and a refiner joined through a waist having substantially less width than either the melter or refiner and including a plurality of glass stirring means positioned in the furnace waist for homogenizing molten glass passing through the waist prior to being conditioned for discharge, the improvement which comprises a transverse row of at least four mixing paddles, each rotatably mounted for rotation about its axis, wherein each mixing paddle includes an axial section comprising two coaxial iron or steel pipes, an inner pipe and an outer pipe, having an annular space between them and a mixing end section comprising an open bent loop having at the upper ends thereof inlet and outlet openings, said bent loop extending below said coaxial inner and outer pipes and said bent loop being connected to the ends of coaxial pipes for providing flow of coolant substantially throughout the length of the annular space; of the inner pipe and of the bent loop, means for rotating said mixing paddles, and means for supplying coolant to said paddles during their rotation.

2. The apparatus according to claim 1 wherein said transverse row of said mixing paddles includes at least ten paddles.

3. The apparatus according to claim 1 wherein each of said mixing paddles has a mixing end section that has an outer loop dimension that is from 3 to 10 times the effective thickness of the mixing end section.

4. The apparatus according to claim 1 wherein each of said mixing paddles has a mixing end section that has an outer loop dimension that is from 3 to 5 times the effective thickness of the mixing end section.

5. The apparatus according to claim 1 wherein each mixing paddle is positioned at an elevation such that its axial section passes through the surface of a pool of molten glass in the furnace and the uppermost part of its mixing end section is substantially immediately below the surface of such a pool of molten glass.

6. The apparatus according to claim 5 wherein each mixing paddle has a height of from about one-fourth to about one-third of the depth of such pool of molten glass and is submerged in the uppermost one-third depth of such pool of molten glass.

7. The apparatus according to claim 1 wherein the closest space between adjacent mixing paddles beneath the surface of molten glass in the furnace is substantially the same as the outer loop dimension of the mixing end section of a mixing paddle.

* * * * *